United States Patent [19]

Olmsted et al.

[11] Patent Number: 4,543,979

[45] Date of Patent: Oct. 1, 1985

[54] LIQUID LEVEL CONTROL HAVING IMPROVED INSTRUMENT AIR VALVE

[75] Inventors: Daniel C. Olmsted; Quin D. Kroll, both of Houston, Tex.

[73] Assignee: Dover Corporation, Tulsa, Okla.

[21] Appl. No.: 633,848

[22] Filed: Jul. 24, 1984

[51] Int. Cl.⁴ .................... F16K 43/00; F16K 31/18; F16K 33/00

[52] U.S. Cl. .................. 137/315; 137/446; 251/251; 251/263; 251/323

[58] Field of Search .......... 137/434, 446, 315, 101.25, 137/409, 412, 386, 213, 214; 251/322, 323, 251, 260, 261, 263, 348

[56] References Cited

U.S. PATENT DOCUMENTS

| | | | |
|---|---|---|---|
| 1,479,028 | 1/1924 | Cooke | 251/323 |
| 1,764,991 | 6/1930 | Siebs | 251/322 |
| 3,970,099 | 7/1976 | Murphy, Jr. et al. | 137/446 |
| 4,133,345 | 1/1979 | Mitchell | 251/323 |

*Primary Examiner*—George L. Walton
*Attorney, Agent, or Firm*—Head, Johnson & Stevenson

[57] ABSTRACT

A liquid level control including a housing for attachment to an opening in a vessel, the housing having an inner chamber with a float extending therefrom, the float responding to changes in liquid level within the vessel, and an outer chamber including a valve for opening and closing an air flow passageway to provide a pneumatic signal in response to the liquid level changes. The housing has a rotatable shaft extending through the wall separating the inner and outer chambers. The valve includes an elastomeric seat which is easily accessable for inspection and is easy to replace.

7 Claims, 4 Drawing Figures

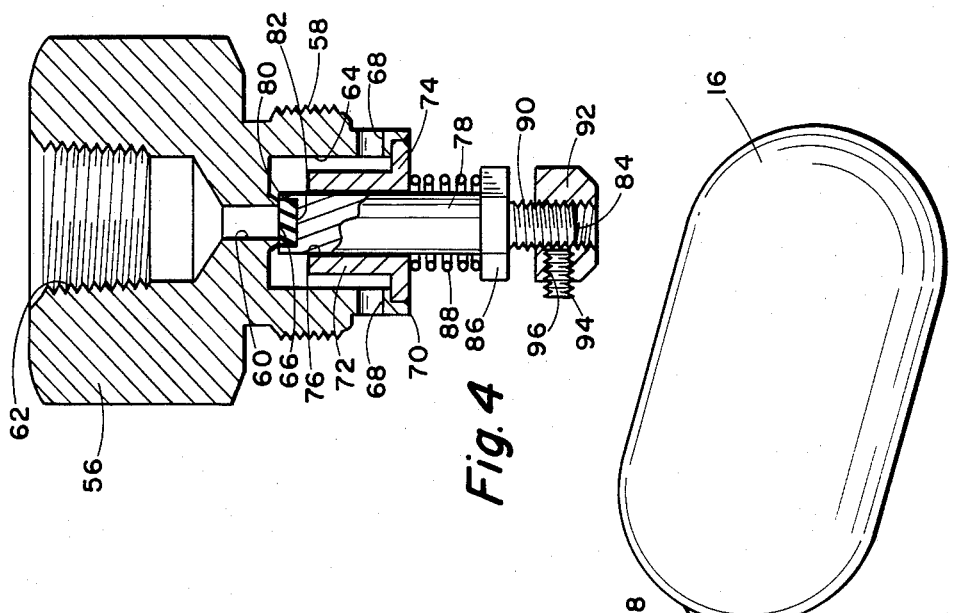
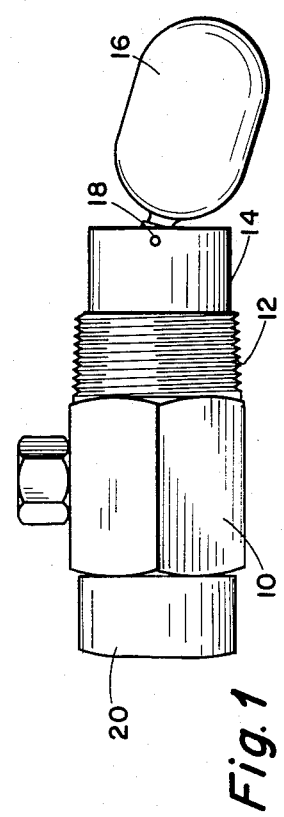
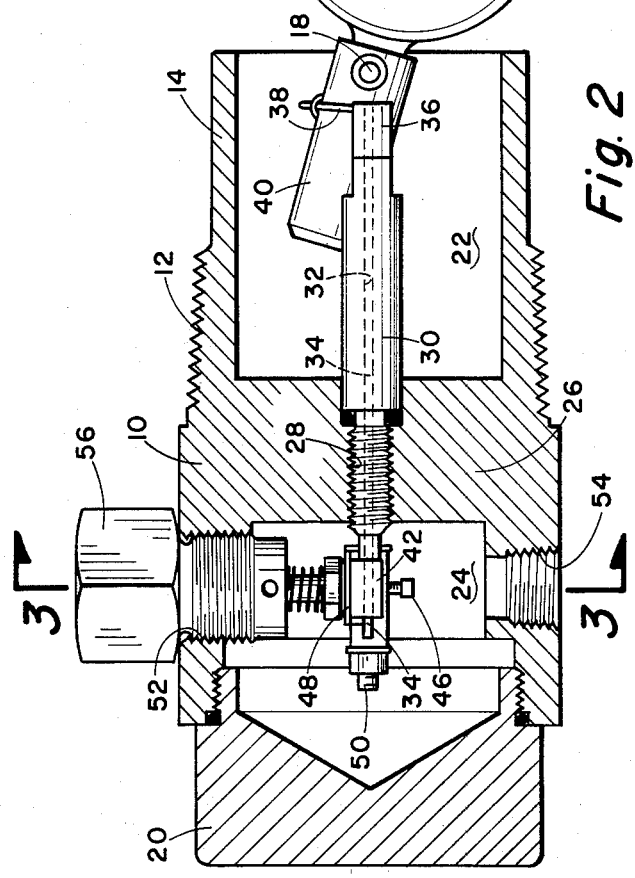

LIQUID LEVEL CONTROL HAVING IMPROVED INSTRUMENT AIR VALVE

SUMMARY OF THE INVENTION

This invention relates to a float actuated pneumatic control of the type which is used to provide a pneumatic signal in response to changing fluid levels in a vessel. The control includes a housing having means at one end, such as external threads, for attachment to an opening in a vessel. The housing is divided internally into an inner and outer chamber by an intermediate wall. In the inner chamber the float is pivoted so as to move up and down in response to fluid flow. A shaft extends sealably through an opening in the wall separating the chamber. The float is connected to rotate the shaft in response to changing fluid levels.

Within the inner chamber of the housing a cam is secured to the shaft and engages a pivoted rocker plate. The housing has a threaded side opening communicating with the inner chamber. Received in this side opening is the body of a valve. The valve body has a flow passageway therethrough and in the inner end, which is received within the housing outer chamber, the body includes a recess of internal diameter larger than and coaxial with the flow passageway. The bottom surface of the recess is configured to provide, surrounding the flow passageway, an annular valve seat.

Positioned within the recess is a valve guide having an opening therethrough. The guide includes, on the outer end, an integral enlarged external diameter portion which is secured to the inner end of the valve body to close it. At least one small radial opening is provided in the valve body adjacent the inner end.

Slideably received in the valve guide is a cylindrical plunger. On the inner end of the plunger is a valve seal which, when the plunger is moved in the direction towards the seat, engages and closes the seat against the passage of air therethrough.

The plunger includes an integral enlarged diameter portion. A spring is positioned on the plunger between the guide and the enlarged diameter portion so that the spring is under compression and urges the plunger away from the valve seat, that is, towards the valve opened condition.

The outer end of the plunger is externally threaded and receives a nut. The nut is configured on its outer end to engage the rocker plate. By threadedly adjusting the nut the precise opening and closing of the valve relative to the position of the float can be regulated.

By the arrangement of the flow passageways air passing through the valve when it is opened is expelled radially of the plunger so that it does not impinge on the rocker plate and thereby does not affect the operation of the control. The valve seal, which preferably is of elastomeric material, is easily available for inspection and replacement if necessary so that the effectiveness of the control can be easily maintained.

DESCRIPTION OF THE DRAWINGS

FIG. 1 is an external view of a pneumatic float control which incorporates the principles of this invention.

FIG. 2 is an elevational cross-sectional view of the control of FIG. 1.

FIG. 4 is an enlarged cross-sectional view of the valve as employed in the control, the valve being shown in the closed position.

DETAILED DESCRIPTION OF THE PREFERRED EMBODIMENT

Figure 3:
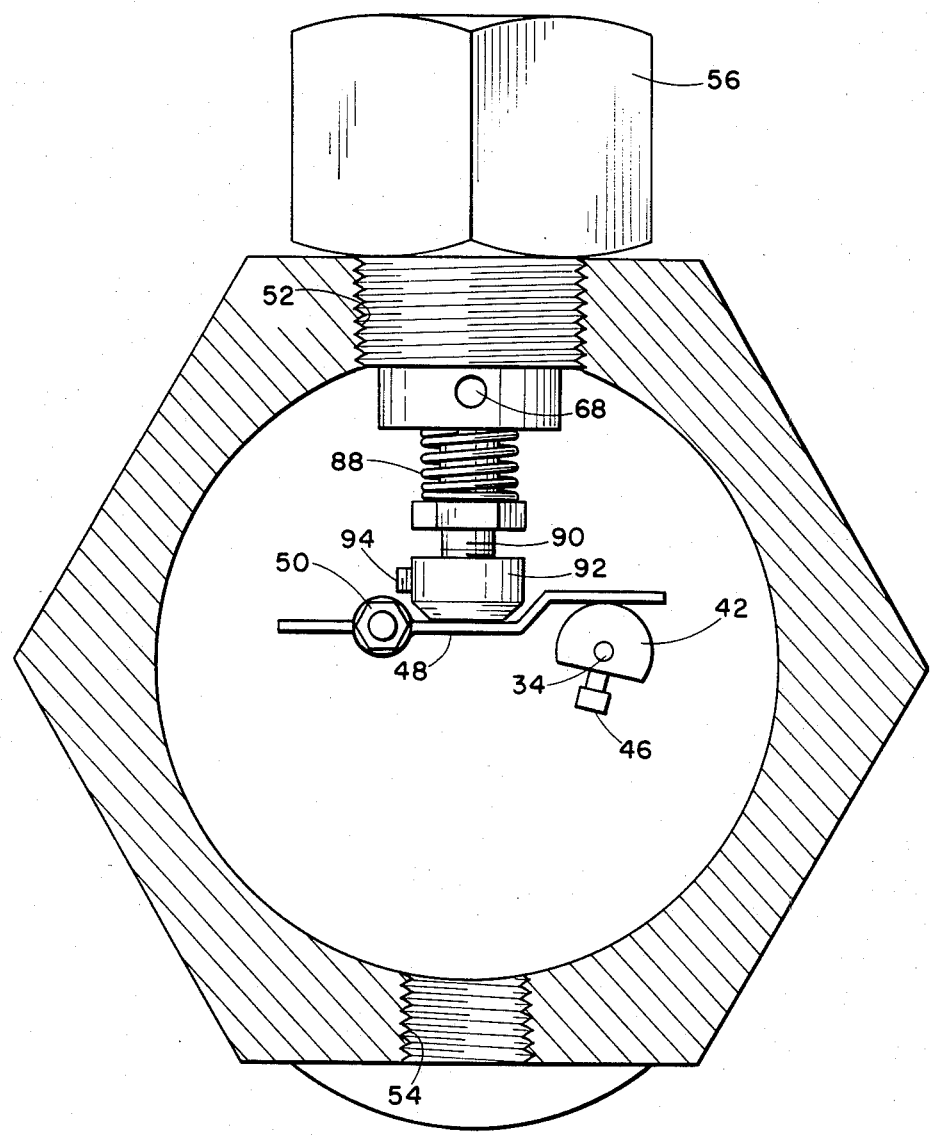
FIG. 3 is a cross-sectional view taken along the line 3—3 of FIG. 2.

Referring now to the drawings and first to FIG. 1, an external view of a valve which incorporates the principles of the invention is shown. The control includes a housing 10 which is elongated and formed primarily of a unitary device. Housing 10 includes external threads 12 by which it may be affixed to an opening in a vessel, such as an internally threaded flanged opening in the wall of the vessel, the vessel not being shown. The inner end portion 14 in the housing thereby extends interiorally of a vessel for a short distance. Affixed to the housing inner end portion is a float 16 which is pivoted about an axis 18. Float 16 rises and falls in response to liquid level within the vessel to which the housing is attached to open and close the flow of air to thereby provide a pneumatic signal for the actuation of other equipment, such as valves which control flow into or out of the vessel.

At the outer end of housing 10 an end cap 20 serves to close the interior of the housing.

Referring now to FIGS. 2 and 3, details of the internal arrangement of the control are shown. The housing 10 has an inner chamber 22 and an outer chamber 24 separated by a wall 26. In the wall is a opening 28 which receives an elongated guide 30. The guide has an axial opening 32 which receives a small diameter shaft 34. Within the inner chamber 22 the shaft 34 has affixed to it a member 36 with a rod 38 extending radially therefrom. Affixed to the inner end of float 16 is a cylindrical counter weight 40. Rod 38 is pivotally secured to the counter weight 40 so that as the float 16 rises and falls, as it pivots about axis 18, rotation is applied to shaft 34.

Within the outer chamber 24 a cam member 42 is affixed to the shaft by means of a set screw 46. (See also FIG. 3.) A rocker plate 48 is pivotally mounted about a pin 50, the rocker plate engaging the surface of cam member 42.

Formed in the wall of housing 10 is a radial threaded opening 52 and, opposite it is a second threaded opening 54.

The device described up to this point in a standard type of float actuated liquid level control such as used in industry and as exemplified by U.S. Pat. No. 3,970,099 entitled: "Liquid Level Responsive Vent Valve", issued July 20, 1976.

Positioned within the threaded opening 52 is a valve body 56. The details of the valve, which represent the essence of the present invention are shown best in the enlarged cross-sectional view of FIG. 4. The valve body includes a reduced diameter externally threaded portion 58 which engages the opening 52 in the housing. The portion of the body extending exteriorally of the housing is preferably hexagonal as shown in FIGS. 2 and 3 to facilitate securing the valve body to the housing.

The valve body has a flow passageway 60 therethrough. The outer portion of the flow passageway is enlarged and internally threaded at 62 to receive a pipe which may be of ¼ inch nominal size for conducting air pressure to the valve. The inner end of the flow passageway is formed of an enlarged internal diameter recess 64. The bottom of the recess defines an annular valve seat 66 which surrounds the passageway 60. A number of small diameter radial openings 68 are formed in the body adjacent the inner end 70, the openings communicating with the portion of the passageway defined by the recess 64.

Positioned within the recess 64 is a guide 72 which is cylindrical and has an external diameter less than the internal diameter of recess 64. At its outer end guide 72 has an integral enlarged external diameter portion 74 which engages and closes the inner end 70 of the valve body. This can be accomplished such as by welding or soldering the enlarged portion 74 of the guide to the valve body. Guide 72 further includes an axial opening 76.

Received within the guide axial opening 76 is an elongated cylindrical plunger 78, the external diameter of the plunger being slightly less tham the internal diameter of the guide opening. At the inner end of plunger 78 a recess 80 is formed which captures an elastomeric seat element or seal 82 which may be made of rubber, either natural or synthetic, or of plastic or the like. The seat element 82 engages, when the valve is closed as shown in FIG. 4, the valve seat 66 to close the flow of fluid through the valve.

Integrally formed adjacent the plunger outer end 84 is integral enlarged diameter portion 86 which is hexagonal on its exterior surface. Received about the plunger is a compression spring 88, one end abutting against the guide 72 and the other abutting against the enlarged diameter portion 86.

The portion of the plunger adjacent the outer end 84 is externally threaded at 90 and receives an internally threaded nut 92. A set screw 94 is positioned in a threaded radial opening 96 in the nut so that when the nut is positioned in the desired threaded location on plunger 78 the set screw 94 may be tightened to retain it in the selected position. The outer end of the nut 92 is configured to engage the rocker plate 48.

Air pressure is applied to the valve by piping (not shown) connected to the threaded opening 62. Flow of air through the valve is controlled by the position of float 16. By the orientation of the cam 42 on shaft 34, the valve can be set to either open or close as fluid level rises and conversely, to open or close as fluid level falls.

It is important in proper actuation of pneumatic controls that the valve open or close at precise positions of the float 16. This can be controlled in two ways. First, the position of cam 42 on shaft 34 is adjustable. However, this adjustment is somewhat crude and in order to provide a second and more precise adjustment of the closing or opening of the valve nut 92 is employed. The set screw 94 is loosened. By means of a small wrench affixed to the plunger portion 86 and another wrench affixed to the hexagonal nut 92, the nut may be accurately positioned on the plunger after which the set screw 94 may be tightened.

It can be seen that a most important element for providing a pneumatic signal upon the rising and falling of float 16 is 82 which closes against annual valve seat 66. Further, it can be appreciated that in order to insure continued trouble free operation it is desireable that the valve seal be subject to ready inspection and replacement. The pneumatic control of this invention satisfies these conditions. The seal 82 can be readily inspected by simply removing plunger 78. Since the seal 82 is directly on the end of the plunger it is in plane view for inspection. If it is worn or damaged, the old seal can be popped out of recess 80 using a knife or any pointed instrument and a new seal inserted. This can be achieved without the use of special tools and without the need for skilled labor.

The use of float actuated pneumatic controls is well known in industry and is represented such as by U.S. Pat. No. 3,970,099 previously mentioned, and by the prior art patents cited in this patent. The present invention provides not only an improved valve arrangement from a structural point of view but most importantly, provides a valve which may be very accurately adjusted to control precisely the opening or closing of the valve at a particular fluid level in the vessel to which the valve is attached.

While the invention has been described with a certain degree of particularity, it is manifest that many changes may be made in the details of construction and the arrangement of components without departing from the spirit and scope of this disclosure. It is understood that the invention is not limited to the exemplified embodyments set forth herein but is to be limited only by the scope of the attached claim or claims, including the full range of equivalency to which each element thereof is entitled.

What is claimed is:

1. For use with a liquid level control having a body with an actuating member isolated from the liquid and which is displaced in response to changing liquid levels, a valve for regulating the flow of instrument control air through the body, the valve comprising:

a valve body including means for attachment to a liquid level control body, the valve body having means at the first end for connecting a source of instrument control air thereto, the body having a flow passageway therethrough, the valve body having a recess in the second end coaxial and communicating with said flow passageway, and having, within said recess, an annular valve seat surrounding said flow passageway, and having at least one vent opening adjacent the second end of the valve body communicating with said recess;

a cylindrical guide member for external diameter less than the internal diameter of said valve body recess, and having an integral enlarged diameter portion at one end, and having a cylindrical passageway therethrough, the guide member being received in said valve body recess, the guide member enlarged diameter portion being secured to said valve body and serving to close off said recess;

an elongated plunger having inner and outer ends, the inner end portion being cylindrical and of external diameter slightly less than said guide member cylindrical passageway and being telescopically received in said passageway, the plunger being longitudinally movable towards a valve open and a valve closed portion;

a valve seat element of resilient material and of diameter less than said plunger and being affixed to said plunger inner end and engagable with said valve body valve seat, the outer end of said plunger being engaged by the level control actuating member to move said plunger relative to said valve seat in response to changing fluid levels, the valve when opened providing air flow through said passageway and exteriorly of said guide member and out said valve body vent opening, the said plunger being removable from said guide member without disassembling of said guide member whereby said valve seat element is easily inspected and repaired.

2. A valve for regulating the flow of instrument air according to claim 1 wherein said plunger has external threads on the outer end portion, and including:
- an adjusting nut threadably received on said plunger threaded outer end portion, the adjusting nut being configured to be engaged by the level control actuating member.

3. A valve for regulating the flow of instrument air according to claim 1 including means to bias said plunger towards the open position.

4. A valve for regulating the flow of instrument air according to claim 3 wherein said plunger member has an enlarged diameter portion adjacent to and spaced from said outer end, and including:
- a coiled spring received by said plunger and compressibly extending between said guide member and said plunger enlarged diameter portion, the spring serving to bias said plunger towards the valve open position.

5. A valve for regulating the flow of instrument air according to claim 1 wherein the inner end of said plunger has a recess therein and wherein said valve seat element is formed of a disc of resilient material removably received in said recess.

6. A liquid level control comprising:
- a housing having first and second chambers separated by a wall, the housing being adapted to be coupled to a liquid containing vessel with the first chamber in communication with the vessel, and including a passageway in the wall separating said chambers;
- a pivoted float on said housing near said one end including a float arm extending into said chamber;
- a shaft rotatably and sealably received in said opening in housing wall, and including means coupling said shaft for the rotation thereof by the movement of said float arm;
- an actuator member in said housing second chamber to and arranged for displacement in response to relation of said shaft;
- a valve body including means affixed to said housing level, the valve body having means at the first end for connecting a source of instrument control air, the body having a flow passageway therethrough, the valve body having a recess in the second end coaxial and communicating with said flow passageway, and having, within said recess, an annular valve seat surrounding said flow passageway, and having at least one vent opening adjacent the second end of the valve body communicating with said recess;
- a cylindrical guide member of external diameter less than internal diameter of said valve body recess, and having an integral enlarged diameter portion at one end, and having a cylindrical passageway therethrough, the guide member being received in said valve body recess, the guide member enlarged diameter portion being secured to said valve body and serving to close off said recess;
- an elongated plunger having inner and outer ends, the inner end portion being cylindrical and of external diameter slightly less than said guide member cylindrical passageway and being telescopically received in said passageway, the plunger being longitudinally moveable towards a valve open and a valve closed position;
- a valve seat element of resilient material and of diameter less than said plunger and being affixed to said plunger inner end and engageable with said valve body valve seat, the outer end of said plunger being engaged by the level control actuating member to move said plunger relative to said valve seat in response to changing fluid levels, the valve when opened providing air flow through said passageway and exteriorly of said guide member and out said valve body vent opening, said plunger being removable from said guide member whereby said valve seat element may be easily inspected and repaired.

7. A valve for regulating the flow on instrument air according to claim 6 wherein the inner end of said plunger has a recess therein and wherein said valve seat element is formed of a disc of resilient material removably received in said recess.

* * * * *